United States Patent Office 3,652,463
Patented Mar. 28, 1972

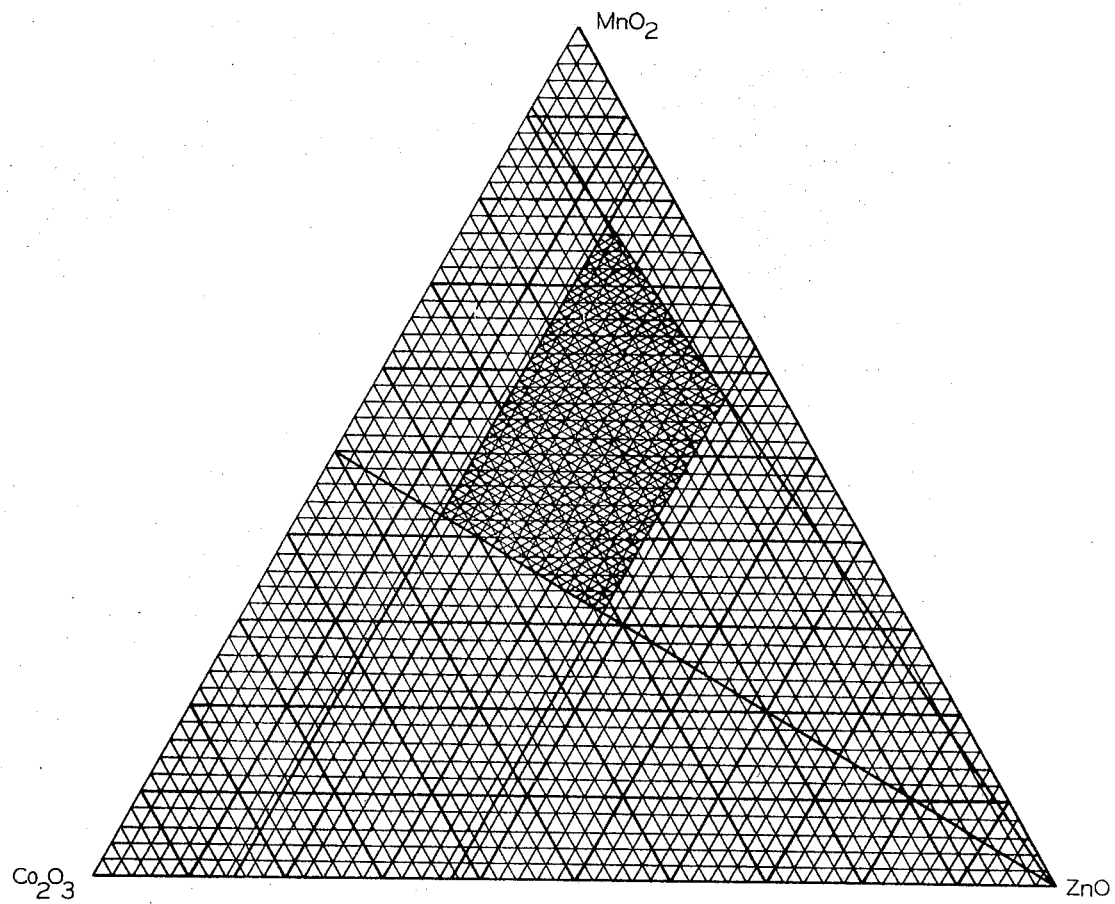

3,652,463
THERMISTOR COMPOSITION
John W. Riddel, Fenton, Mich., assignor to General Motors Corporation, Detroit, Mich.
Filed Jan. 26, 1970, Ser. No. 5,852
Int. Cl. C09c 1/04; H01b 1/06
U.S. Cl. 252—519                                    3 Claims

ABSTRACT OF THE DISCLOSURE

A composition for a thermistor wherein the composition comprises approximately ⅓ mole percent zinc oxide, ⅓ mole percent cobaltic oxide, and ⅓ mole percent manganic oxide reacted to form a spinel structure.

---

The invention relates generally to thermistors and more particularly to an improved composition of the same.

This invention is related to that of U.S. S.N. 487,563 now Pat. 3,430,336 assigned to the assignee of the present invention.

A number of patents suggest the use of mixtures of Mn, Ni, Co, Cu, Fe, and Zn oxides for transistor compositions. There are at least several hundred combinations of systems possible using these six oxides, most of which are not really suitable for thermistor materials because of too high resistance or instability or poor mechanical properties. The subject specification discloses and claims a Zn-Mn-Co oxide system that is uniquely optimum.

One object of the present invention is to provide an improved thermistor having a high temperature coefficient.

A further object of the present invention is to provide a thermistor composition that can be fired in air.

Another object of the present invention is to provide a thermistor composition that has improved stability.

The above and other objects will be more apparent when the following specification is read in conjunction with the accompanying drawing which is a triangular diagram showing the preferred thermistor composition of cobalt, manganese and zinc oxides according to the invention.

For an understanding of the preferred thermistor composition, reference is made to the drawing in which a triangular-coordinate scale has been used to represent the relative proportion of the three oxides contained in the composition.

By reference to the drawing, it is seen that the percentage of zinc oxide present may vary from 15 to 37% by weight, the percentage of manganese oxide present may vary from 31 to 77% by weight and the balance to total 100% consists of cobalt oxide. A preferred composition is 20.05% zinc oxide, 39.05% manganese oxide and 40.95% cobalt oxide.

The manganese oxide may be manganese dioxide ($MnO_2$), manganic oxide ($Mn_2O_3$), manganese trioxide ($MnO_3$) or manganese heptoxide ($Mn_2O_7$). The cobalt oxide is in the form of cobaltous oxide (CoO), cobaltous-ic oxide ($Co_3O_4$), or cobaltic oxide ($Co_2O_3$). When the various oxides are substituted one for another on the basis of the metal in the oxide, the final product will be the same since its state of oxidation is determined by the atmosphere and temperature during firing.

The following example is given to illustrate the invention, it being understood that the invention is not to be limited to such specific details.

The following substances are crushed in distilled water for approximately 8 hours.

|  | Moles | Mole percent |
|---|---|---|
| ZnO | .3 | 23.0 |
| $MnO_2$ | .6 | 46.1 |
| $CoO_{1.5}$ | .4 | 30.8 |

The product is preferably dried and fired at a temperature of about 1400° C. in a furnace open to the atmosphere for approximately 2 hours. The product is thereafter crushed and passed through a 320-mesh sieve and mixed with sufficient wax to form pellets. The pellets are then granulated to pass through a 28-mesh sieve but be retained on an 80-mesh sieve using a wax binder. The granulated product is then pressed into a pellet shape at a pressure of approximately 10,000 p.s.i. The pellets are then dried and may be cut into pieces. These pellets are fired at a temperature of 2550° F. (1400° C.) for 1 hour. Silver contacts are then fired on the pellets at 1500° F. although platinum contacts may be embedded in the pellets if desired. In making the platinum type of contact, the pressed thermistor is bisque-fired to 1900° F., a hole drilled for a 0.020 platinum lead wire and fired with the lead in place. Either firing silver or glazing around the fired-in lead assures electrical contact.

The thermistor may then optionally be coated with a glaze to improve its stability. The glaze can be applied by dipping, spraying or brushing. The preferred glaze composition is given below:

TABLE I

| Material: | Parts by wt. |
|---|---|
| Ferro Corporation 2501 Flake Frit [1] | 500 |
| Ferro Corporation 2502 Flake Frit | 500 |
| Clay | 50 |
| Borax | 2.5 |
| Sodium nitrite | 1.0 |

[1] The flake frit is described by the manufacturer as being alkali-boro-aluminum silicates.

After the thermistor is coated with the glaze composition, it is thoroughly dried at low temperatures to insure an even coating. The coated thermistor is then fired at 1500° F. for five minutes. Upon measuring the resistance, it was found that the material had a resistivity of approximately 8300 ohm-cm. at room temperature. The resistivity-temperature characteristics of the thermistor are shown as follows:

TABLE II

| Temperature, ° F. | Resistance | Percent change/ ° F. |
|---|---|---|
| 140 | 1,080 | 2.40 |
| 200 | 279 | 2.00 |

Three thermistors having the above composition increased in resistance an average of 2.3% at 140° F. and 4.2% at 200° F. during a 500 hour stability test. This test consisted of cycling the thermistor mounted in a probe from cold tap water to hot water (200° F.) at 24 cycles per hour with 14.5 volts applied to the thermistor in series with a 50 ohm resistor. The thermistor probe assembly contained a dielectric fluid. No significant resistance change occurs when the thermistor is operated for the same time in an air atmosphere.

An additional feature of the thermistor composition according to this invention is that the resistivity can be increased by a factor of up to a thousand or more by adding alumina. The resistivity increase depends on the method of mixing the alumina into the material and on the percentage of alumina. For a particular method of adding alumina the following linear dependence of log of room temperature resistance versus percent alumina was obtained (milled for one hour in a steel mill followed by an acid leach):

| Percent alumina | R/25° C. (K ohm) | Log R/25° C. |
|---|---|---|
| 0 | 4.0 | 3.602 |
| 3 | 6.1 | 3.778 |
| 6 | 9.3 | 3.966 |
| 9 | 14.0 | 4.146 |

As noted above the temperature coefficient is only slightly increased by the addition of alumina. A batch of material containing approximately 20% alumina milled for 8 hours had a resistivity of 640 times that of the above material with no alumina. Although the above composition contains up to 9% alumina, these compositions can contain up to 50% alumina. The advantage of adding alumina to increase resistance is that it gives an easy method for controlling resistivity over wide ranges. In addition, it can be used to shift the useable resistance range to higher temperatures.

The long term stability at 1400 to 1600° F. of a group of thermistors manufactured according to the above was investigated as follows:

Chromel wires were welded to the embedded platinum leads of six rod type thermistors approximately ½″ long by .090″ square.

The thermistors were mounted in a furnace. Resetability of the furnace temperature controller was ½° F. A 12-volt battery was connected to each thermistor in series with a 2000 ohm resistor. Provisions were made for measuring thermistor voltage and current to ½% accuracy.

The furnace temperature was set and held at 1400° F. for 2 months, increased to 1600° F. for ¼ month, returned to 1400° F. for 2½ months, reset to 1600° F. for 1 month, and then alternated weekly between 1400 and 1600° F.

The following table gives the average resistance of the thermistors at the times indicated.

TABLE III

| Time | Prior treatment | R (1,400° F.) | R (1,600° F.) |
|---|---|---|---|
| Start | None | 275 | |
| 1 mo | 1 mo. at 1,400° F | 319 | |
| 2 mo | 2 mo. at 1,400° F | 314 | 116 |
| 2¼ mo | ¼ mo. at 1,600° F | 243 | 106 |
| 4¾ mo | 2½ mo. at 1,400° F | 256 | 106 |
| 5¾ mo | 1 mo. at 1,600° F | 226 | 101 |
| 11¼ mo | 5½ mo. cycling | 224 | 101 |

Thermodynamic considerations lead to the conclusion that the stable state during the last 5½ months of the test can be achieved in a short time at a higher temperature. After this aging process the thermistor changes less than 1% during 5½ months alternated weekly between 1400 and 1600° F. Since the thermistors have a temperature coefficient of resistance of .353%/° F. at 1400° F., the 1% resistance change corresponds to a temperature difference of less than 3° F.

This thermistor is suitable for many engine exhaust sensing and control applications since it has long term stability comparable to a thermocouple and operates at much higher current levels. The higher currents permit the use of less sensitive and therefore less expensive control or sensing instruments.

The most preferred composition is 33⅓ mole percent zinc oxide, 33⅓ mole percent cobaltic oxide, and 33⅓ mole percent manganic oxide arrived at by recent investigation.

An X-ray diffraction analysis of thermistors of this composition prepared essentially as in the previous example revealed that the final product had a slightly distorted spinel structure.

This composition was found to have the same temperature coefficient as the previous example but a resistivity of only 4500 ohm-cm., at room temperature.

As may be noted, this composition is designed to yield a single phase spinel structure according to any of the following reactions:

(1)
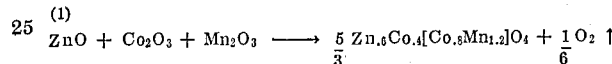

(2)
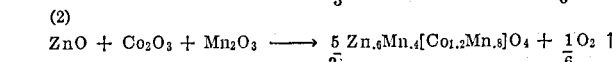

(3)
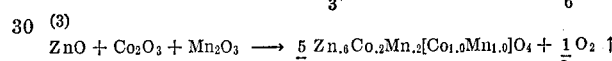

The lower resistivity obtained from this material is assumed to result from the formation of a single phase according to one of these reactions. Consideration of the previous composition shows that it cannot form a single phase except as a solid solution of a manganese cobalt zinc spinel and a manganous manganic spinel.

What is claimed is:

1. A thermistor composition consisting essentially of 20.05 parts by weight of zinc oxide, 39.05 parts by weight manganese oxide and 40.95 parts by weight cobalt oxide.

2. A thermistor composition consisting essentially of 33⅓ mole percent zinc oxide, 33⅓ mole percent cobaltic oxide, and 33⅓ mole percent manganic oxide reacted to form a distorted spinel structure.

3. A thermistor composition consisting essentially of 15 to 37.5 parts by weight of zinc oxide, 31 to 77 parts by weight of manganese oxide and 5.5 to 42.5 parts by weight of cobalt oxide.

References Cited

UNITED STATES PATENTS

| 2,258,646 | 10/1941 | Grisdale | 252—519 |
| 3,037,942 | 6/1962 | Ingold et al. | 252—519 |
| 3,503,029 | 3/1970 | Matsuoka | 252—518 |
| 3,515,686 | 6/1970 | Bowman | 252—518 |

DOUGLAS J. DRUMMOND, Primary Examiner

U.S. Cl. X.R.

106—296; 23—147

PO-1050
(5/69)

UNITED STATES PATENT OFFICE
CERTIFICATE OF CORRECTION

Patent No. 3,652,463          Dated March 28, 1972

Inventor(s) John W. Riddel

It is certified that error appears in the above-identified patent and that said Letters Patent are hereby corrected as shown below:

Column 2, line 7, "$CoO_{15}$." should read -- $CoO_{1.5}$ -- .

Signed and sealed this 11th day of July 1972.

(SEAL)
Attest:

EDWARD M. FLETCHER, JR.
Attesting Officer

ROBERT GOTTSCHALK
Commissioner of Patents